United States Patent [19]

Trepanier

[11] Patent Number: 4,678,923
[45] Date of Patent: Jul. 7, 1987

[54] WINDMILL

[76] Inventor: Fernand Trepanier, 680 - 30th Street, St. Georges Ouest, Beauce County, Quebec, Canada, G5Y 4H4

[21] Appl. No.: 841,479

[22] Filed: Nov. 13, 1985

[51] Int. Cl.$^4$ .............................................. F03D 7/00
[52] U.S. Cl. .................................... 290/55; 416/137; 416/139
[58] Field of Search .................. 416/7, 8, 131, 134 R, 416/135, 136, 137; 290/55

[56] References Cited

U.S. PATENT DOCUMENTS

| | | | |
|---|---|---|---|
| 1,661,921 | 3/1928 | Cerfvol | 416/135 |
| 2,757,745 | 8/1956 | Verhage et al. | 416/138 A |
| 2,990,018 | 6/1961 | Moore | 416/134 |

FOREIGN PATENT DOCUMENTS

| | | | |
|---|---|---|---|
| 1040906 | 10/1958 | Fed. Rep. of Germany | 416/139 R |
| 1118110 | 11/1961 | Fed. Rep. of Germany | 416/131 |
| 124935 | 4/1919 | United Kingdom | 416/137 |

Primary Examiner—Bernard Roskoski

[57] ABSTRACT

A windmill for generating electricity in which each blade of the air-screw is connected to the hub by means of at least two resilient strips which are oppositely inclined both in the plane of rotation of the blade and in a plane extending through the rotational axis of the hub. This arrangement results in automatic pitch increase of the blades with increase of air-screw rotation due to the increasing centrifugal force exerted on the blades. This regulates air-screw speed and prevents excessive speed, especially at low load under high-speed wind. This pitch-varying mechanism can also be applied to automotive cooling fans. In accordance with another characteristic, the windmill proper consisting of the air-screw and the electric generator driven thereby, is attached to the supporting tower by a spring system, whereby any shock imparted to the windmill by wind gust, or sudden changes of direction of the wind, will be absorbed by this resilient mounting, thereby diminishing the stresses imparted to the support tower.

5 Claims, 11 Drawing Figures

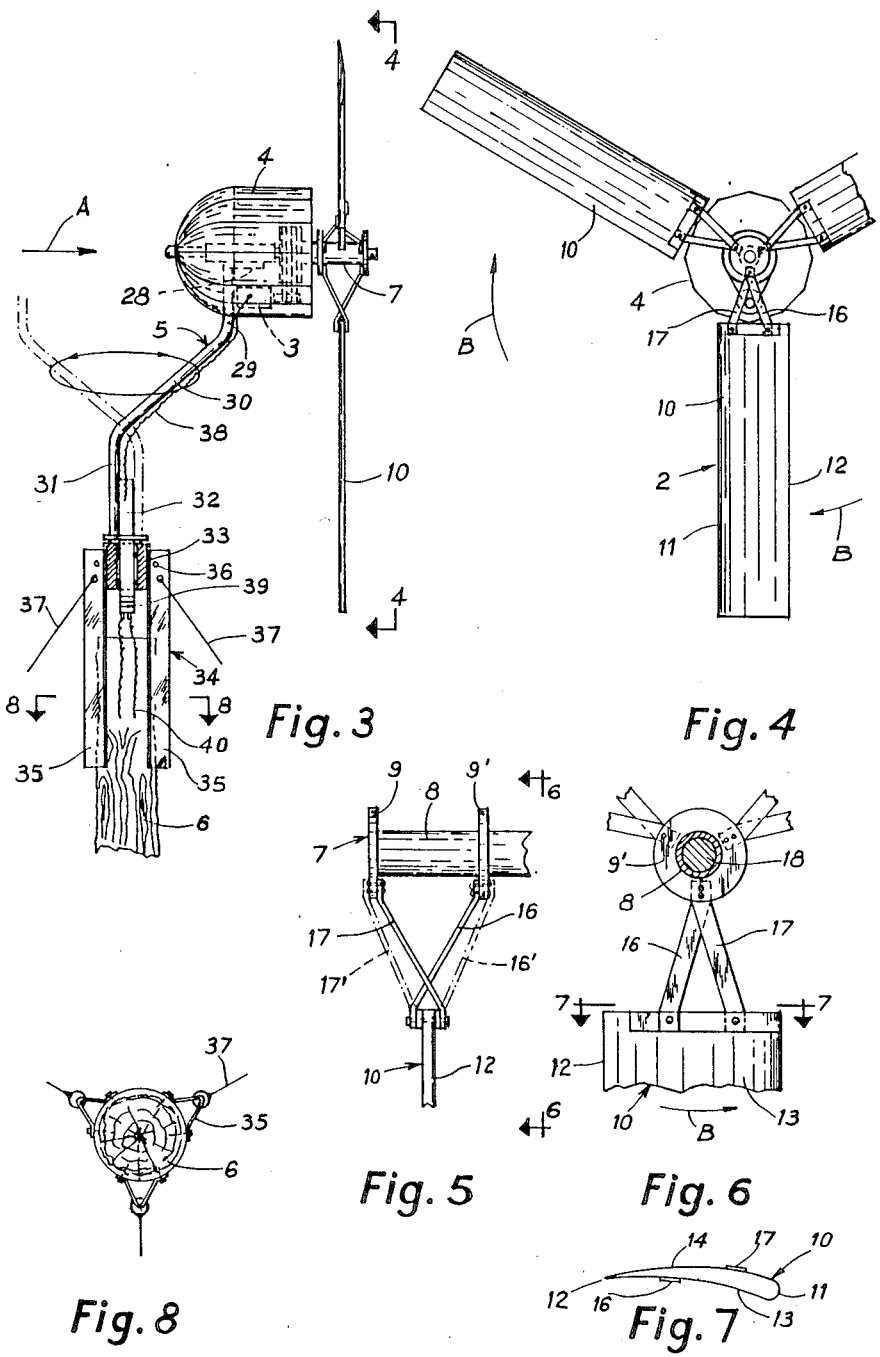

U.S. Patent   Jul. 7, 1987   Sheet 3 of 3   4,678,923
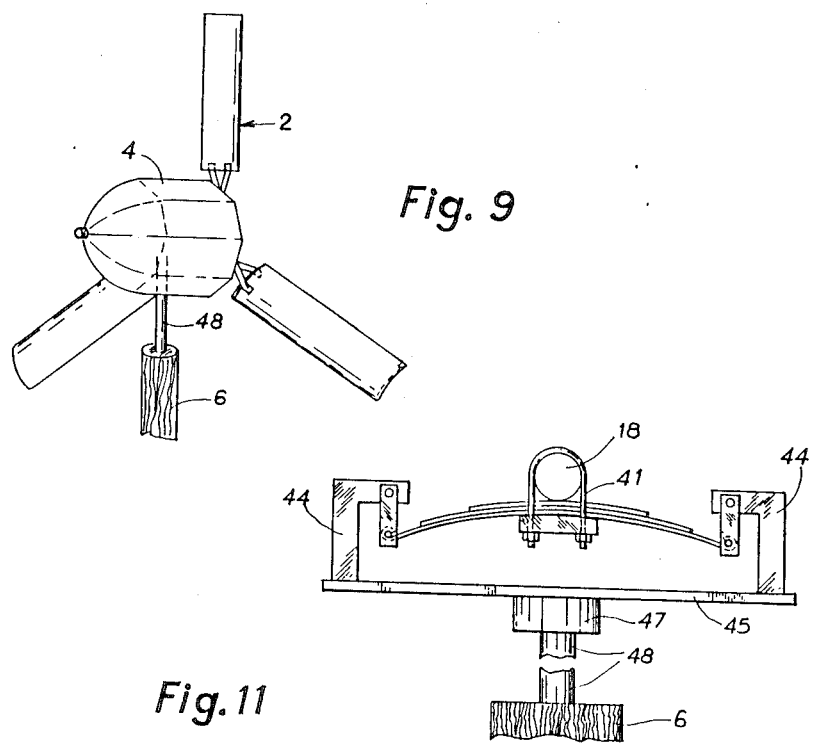
Fig. 9
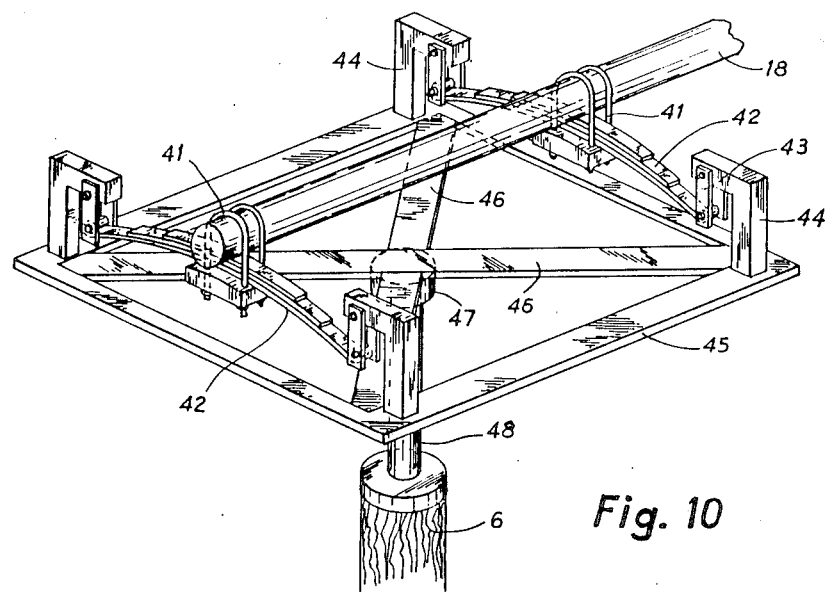
Fig. 11
Fig. 10

WINDMILL

FIELD OF THE INVENTION

The present invention relates to windmills and to air-screws of the type having a pitch-varying mechanism.

BACKGROUND OF THE INVENTION

It is known to provide a mechanism to vary the pitch of air-screws, such as in helicopters and air-planes. However, such mechanisms are highly complex and, therefore, expensive to manufacture and not suitable for windmills especially of the domestic type, which must be built at the least cost possible. In windmills, it is desirable to provide the air-screw with a variable pitch characteristic to prevent excessive speed of the air-screw in high wind condition and especially when the load on the air-screw is small or nil.

Air-screws, more particularly ventilator fans used in automobiles for cooling the liquid coolant in the radiator, are at the present time not equipped with a variable pitch feature; but it would be advantageous to so equip the same in order to automatically set the fan blades at zero pitch when the automobile travels at high speed, so as to conserve energy. Reverting to windmills, the mounting of the windmill on a support tower is generally rigid and the tower must therefore be firmly supported in an upright position to resist wind gusts. This considerably complicates the installation of windmills.

OBJECTS OF THE INVENTION

It is therefore the general object of the present invention to provide an air-screw, either of the passive type, such as to be rotated by the wind as used in a windmill, or of the active type, such as an air propeller or air fan, provided with simple means to automatically vary the pitch of the air-screw blades in accordance with the variation of rotational speed of the air-screw.

It is another main object of the present invention to provide a windmill in which the windmill proper is attached on a support tower by resilient means, so as to considerably diminish the stresses imparted to the tower due to sudden changes in the speed or direction of the wind.

It is another object of the present invention to provide a windmill in which the variable pitch mechanism is completely automatic in its operation.

It is another object of the present invention to provide a windmill of minimum weight with respect to the power output of its generator, so as to again diminish the cost of the supporting tower.

SUMMARY OF THE INVENTION

The variable pitch air-screw of the invention includes a hub and at least two radially-extending blades, each having a root radially spaced from the hub and connected to the same by at least two resilient strips. The strips are oppositely inclined in both the plane of rotation of the blades and in the plane extending through the rotational axis of the hub. Therefore, with increasing rotational speed of the air-screw and consequent increasing centrifugal force exerted on the blades, the strips, being resilient, gradually flex, causing rotation of the blades about their longitudinal axis, and thus, increase of their pitch.

In accordance with the second characteristic of the invention, the windmill proper, including the assembly of the air-screw and of the electric generator driven thereby, is mounted on a supporting tower by means of a flexible spring-like member or members, which absorb any shock caused by wind gusts on the windmill and, therefore, the supporting tower and/or its anchoring means can be made less rigid and strong than otherwise.

BRIEF DESCRIPTION OF THE DRAWINGS

The foregoing will become more apparent during the following disclosure by referring to the drawings, in which:

FIG. 3 is a side elevation of the windmill mounted on top of a supporting tower, partially shown;

FIG. 4 is a front elevation of the windmill, taken along line 4—4 of FIG. 3;

FIG. 5 is a partial side elevation of the hub and part of a blade and its connector strips;

FIG. 6 is a section taken along line 6—6 of FIG. 5;

FIG. 7 is an end view of the root end of the blade and taken along line 7—7 of FIG. 6;

FIG. 8 is a cross-section taken along line 8—8 of FIG. 3;

FIG. 9 is a perspective view of a windmill in accordance with a second embodiment;

FIG. 10 is a perspective view of the inner supporting structure for the generator and air-screw of the second embodiment; and FIG. 11 is an end elevation of the structure of FIG. 10.

Figures 1, 2:
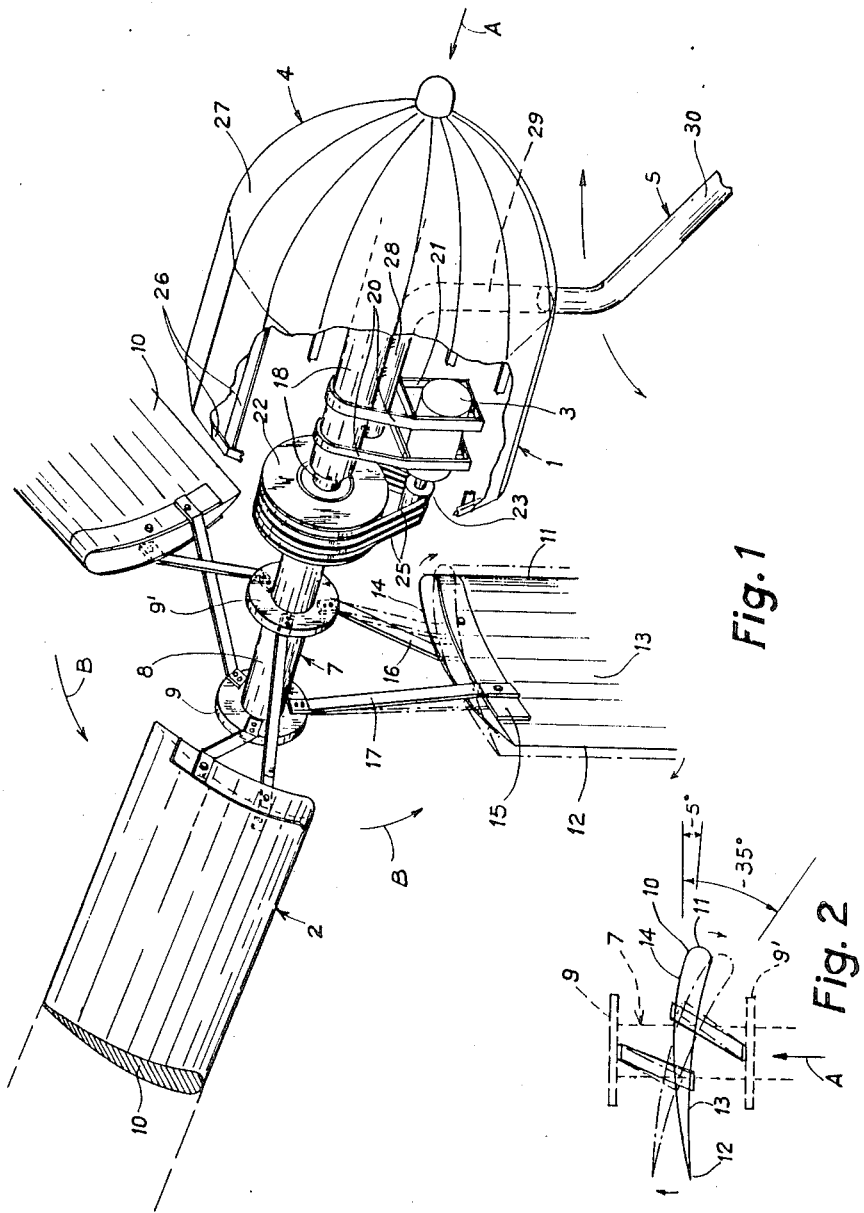
FIG. 1 is a perspective view of part of a first embodiment of the windmill of the invention, with parts broken away, to show the interior arrangment.
FIG. 2 is an end view of the root of one blade and of the resilient strips connecting the blade to the hub shown as being above the blade, the figure also showing the pitch variation of the blade.

Referring now more particularly to the drawings in which like reference characters indicate like elements throughout, the windmill proper, generally indicated at 1, is shown in FIG. 1 and comprises essentially an air-screw 2, which drives an electric generator 3 located in a protective housing 4. The windmill is supported by means of a member 5 on top of a post 6, shown in FIG. 3, or similar tower, which may be, for instance, 20 meters high, depending on the location of the windmill.

The air-screw 2 comprises a hub 7, which includes a tubular member 8, and spaced flanges or collars 9 and 9′. The air-screw further includes a plurality of radially-extending and angularly-equally-spaced radial blades 10. In the case illustrated, there are three blades, 120 degrees apart. Each blade has an air-foil profile for laminar air flow with a thicker leading edge 11 and a thinner trailing edge 12. Each blade has a concave surface 13 facing the wind coming from the direction shown by arrow A and a convex face 14 opposite the wind direction. Each blade 10 is substantially rigid but of light weight construction, such as a resin impregnated with glass fibres for the skin and a core of foam plastic. The root 15 of each blade is thickened and is radially spaced from the hub 7. Each blade is connected to the flanges, or collars 9, of the hub by means of a pair of resilient connector strips 16 and 17. These connector strips are made of spring steel or the like resilient material and are bent at the desired angle near their end portions. Connector strip 16 of each blade, which is the leading strip with respect to the direction of rotation of the blades, shown by arrows B, under the action of the wind, is rigidly connected at one end to the collar 9' and at its other end to the root 15 of the blade 10 at the convex face 14 of the blade and near the leading edge 11. Connector strip 17, which is the trailing strip with respect to air-screw rotation, is rigidly connected at its radially inner end to the collar 9, and at its radially outer end to the root 15 of the blade 10 on the concave face 13 thereof and near the trailing edge 12 of said blade.

It is therefore seen that the two connector strips 16 and 17 are oppositely inclined to each other, both in the plane of rotation of the blades and in a plane extending through the rotational axis of the hub 7 (see FIGS. 5 and 6). In the example shown, the attachment points of the two connector strips 16, 17 to the collars 9 and 9' are positioned in a common plane extending through the long axis of the hub, while the attachment points of the connector strips 16 and 17 to the root 15 of the blade 10 are connected to said root at spaced points transverse to the blade and also across the thickness of the root 15. The arrangment is such that with increasing centrifugal force exerted on the blade with increase in the air-screw rotational speed, the connector strips 16, 17 being resilient, tend to take a radial position with respect to their respective attachment point to the collars 9 and 9', and this causes rotation of the respective blades 10 about their longitudinal axis, resulting in a variation of pitch. More particularly, there is produced an increase of pitch with increase of the speed of the air-screw. This is clearly shown in FIG. 2, wherein at low air-screw rotational speed, the pitch of the blade with respect to the direction of travel of the blade is small at low air-screw speed and, consequently, at low wind speed, and increases with the increase of the air-screw speed under higher wind velocity. For instance, as clearly shown in FIG. 2, the pitch of a blade 10 may vary to such extent that the blade pivots to a position shown in dotted lines in FIG. 2, which is at 35 degrees of an angle relative to the plane of the blade in its initial stationary position. This automatic pitch increase effectively controls the speed of rotation of the air-screw to obtain a substantially uniform speed and excessive speed will be prevented, even in very high wind condition and at low load. Blade pitch increase is also caused by the force of the wind acting on each blade normal to it when the location of the resultant of said force transversely of said blade is nearer the attachment point of strip 17 then of strip 16. This contributes to the operational speed ceiling of the air-screw.

It is clear that the location of the attachment points of the connector strips to the hub and blades, the distance between flanges 9, 9' and/or the stiffness of the strips can be varied to vary the rate of pitch increase and maximum pitch with wind velocity. Obviously, to increase stiffness, the number of strips can be doubled, as shown at 16' and 17' in FIG. 5.

It is noted that the two connector strips serve not only as pitch-varying mechanism but also as a connecting means between the blade and the hub. Furthermore, this connecting means being resilient, any sudden wind gust exerted on the blades will result in the flexing of the connector strips and, therefore, inclination of the blade away from the wind direction.

The other parts of the windmill are also of very simple and lightweight construction. The tubular member 8 of the hub 7 is simply mounted for rotation about an inner stationary shaft 18 supported substantially horizontally. The electric generator 3 is suspended from shaft 18 by means of straps 20. The body of the electric generator 3 is slidably guided in the straps 20, more particularly in the frame 21 formed by said straps. A multi-groove pulley 22 is fixedly mounted on the tubular member 8 of the hub 7 and drives a smaller diameter pulley 23 fixed to the input shaft of the electric generator 3 through a plurality of V-belts 25. Because the electric generator is freely suspended, it acts as a belt tightener under its own weight.

The support shaft 18 also supports the housing, generally indicated at 4, which preferably consists of a rigid framework 26 which supports a flexible lightweight skin 27 made, for instance, of water-proof fabric, and which completely covers the electric generator 3 and the pulleys 22, 23 and belts 25.

Member 5, which suports the entire windmill 1, may consist simply of a resilient rod member, made of spring material, such as spring steel, and bent to have a horizontally-extending upper end portion 28 which is welded, or otherwise secured, to the shaft 18 of the windmill. This horizontal end portion is followed by an integral vertical portion 29, in turn followed by a vertically-downwardly-inclined portion 30, in turn terminated by a vertical portion 31, which is secured at its lower end to a vertical tubular spindle 32 mounted for free rotation about a vertical axis in a cylindrical body 33, which forms part of a bracket, generally indicated at 34, for attaching the windmill on the top of a post 6. This post may consist of an ordinary telephone wooden post. The bracket 34 has, when seen in top plan view, three parallel arms 35 secured and downwardly depending from the cylindrical body 33 and each of V-shape cross-section, as shown in FIG. 8. These arms 35 are adapted to surround and be secured to the top portion of wooden post 6. Each arm 35 is provided with holes 36 to which guy wires 37 are attached at their top end and which are adapted to be anchored in the ground or other suitable ground level structure for maintaining the post 6 in vertical position and, consequently, the axis of the hub 7 normally in substantially horizontal position.

As shown in FIG. 3, and as previously noted, the airmill is of the downwind type. Since the vertically-inclined portion 30 of the supporting member 5 provides sufficient lateral offset of the rotational plane of the air-screw in downwind direction with respect to the vertical axis of rotation of the support member, there is obtained automatic orientation of the windmill in the wind direction, as clearly shown in FIG. 3, without requiring a tail fin. The windmill support rod 5 is free to rotate continuously about the axis of spindle 32.

The output wires 38 of the electric generator 3 run down the support member 5, while being suitably protected against weather, and enter the hollow spindle 32, which is provided at its lower end with rotary connector assembly, generally indicated at 39, for continuous connection with the output wires 40 runing down the post 6 for connection to an electric load and electric control system.

The supporting arrangement formed by resilient member 5 is such that, when there is no wind, the air-screw axis is slightly vertically inclined upwardly with respect to the horizontal; with moderate wind velocity of about 15 to 18 miles per hour, the air-screw axis moves down to become substantially horizontal, with the result that the maximum of wind energy is captured. Under high wind or excessive wind force, the air propeller axis will tend to move down from the horizontal, whereby the air-screw will present a smaller resistance area to the wind. This arrangement also effectively helps in preventing excessive air-screw rotational speed under high wind condition. In a wind burst, the support member 15 will simply bend in a resilient manner. Therefore, any sudden shock which might be otherwise transmitted to the post 6, is considerably reduced, whereby the post itself, and also its anchorage system, may be made less strong than otherwise.

FIGS. 9 to 11 show a second embodiment of the supporting system for the windmill designed for windmills having a greater power output capacity than that of the first embodiment.

In the second embodiment, the windmill proper is exactly the same as in the first embodiment and includes the air-screw 2, the electric generator 3, not shown, the housing 4 with the hub, not shown, of the air-screw rotatably mounted on a support or shaft 18, such as in the first embodiment. The shaft 18 in the second embodiment is fixed by U-shaped clamps 41 to the center of two assemblies of conventional leaf springs 42, such as used for automobile suspensions. The two leaf spring assemblies 42 are freely suspended at their outer ends by means of ordinary automotive shackles 43 to the top of inverted L-shaped brackets 44, themselves upstanding from and rigidly secured to generally rectangular frame 45 provided with diagonal reinforcing bars 46, to the underside of which is secured a wheel member 47 rotatably mounted on a vertical rod 48 for free rotation about a vertical axis. The lower end of rod 48 is secured in any suitable manner, such as by the bracket system 34 of the first embodiment, to the top of the support tower 6. As is the first embodiment, suitable arrangement including rotary electric contacts, is provided for connection of the electric generator suspended from the shaft 18. Shaft 18 can be sufficiently extended from the end of the frame 45, so that the plane of rotation of the air-screw will be laterally offset a sufficient distance from the vertical pivotal axis of the windmill arrangement on post 6, so that the windmill will automatically orient itself in the wind.

It will be understood that with the arrangement of the leaf spring assemblies 42 resiliently supporting the shaft 18 of the windmill, any sudden change in wind direction, either vertically or horizontally, will permit the air-screw 2 to immediately orient itself properly into the wind. Shaft 18 can move up and down, with the leaf spring assemblies 42 flexing accordingly. The shackles 43 permit a lateral angular movement in a horizontal plane in either direction of the shaft 18. Here again, any shock by sudden changes in the wind direction or by wind gusts will be absorbed by the resilient supporting system, so that any strains on the supporting post will be greatly decreased.

Reverting again to the pitch-varying mechanism illustrated in FIGS. 1 to 7, it will be noted that the same can be applied not only to air-screws used for windmills in which the air-screw is driven by the wind, but for air-screws used as propellers in applications where it is desirable to vary the pitch of the propeller blades in accordance with the speed of rotation. Such an application may be found, for instance, in ventilator fans for the liquid-coolant of automotive engines. In such an application, the speed of rotation of the fan increases proportionally to the engine speed. At high-engine revolution, the car or automobile normally travels at sufficient speed, so that cooling is not necessary. It is therefore desirable, in order to eliminate engine drag, to reduce the blade pitch to zero at high-engine speed. Therefore, in order to achieve this, the arrangement of the present invention can be provided, in which the pitch of the blade is initially set at a maximum positive pitch for no rotation of the air-screw or propeller, and to gradually decrease to zero at a predetermined high speed (for instance, referring to FIG. 2, the angular planar variation of the blade may decrease from 35 degrees of angle to zero degree.

I claim:

1. In a windmill, a variable pitch air-screw comprising a hub, a generally horizontally-supported stationary shaft on which said hub is mounted for free rotation, a resilient support for connecting said shaft to a ground-standing supporting tower; at least two rotatable blades, each blade radially extending from said hub and defining a root radially spaced from said hub; one and another collar fixedly mounted axially spacedly on said hub on respective opposite sides of the rotational plane of said blades; each blade having an air-foil profile with a thicker leading edge; a thinner trailing edge; a main concave surface and an opposite convex surface; first and second resilient strips for each blade, the first strip rigidly connected at one end to said one collar and at its other end to the convex surface of one blade root proximate the blade leading edge, the second strip rigidly connected at one end to said another collar and at its other end to the concave surface of the same one blade root proximate its trailing edge; said strips being oppositely inclined to each other and each crossing the rotational plane of said blades; whereby increase of the centrifugal force exerted on said blades will decrease the inclination of said strips and cause rotation of each blade about its longitudinal axis relative to said hub, to thereby increase the pitch of the blades with increase of the rotational speed of said air-screw.

2. In a windmill as defined in claim 1 further including an electric generator suspended from said shaft and a pulley-and-belt drive connected between said hub and said generator for driving the latter by said air-screw.

3. In a windmill as claimed in claim 2, wherein said resilient support is in one piece and has an upper portion rigidly secured to said shaft, a vertically-extending lower portion rotatably mounted for free rotation about a vertical axis with respect to said supporting tower and an intermediate vertically-inclined portion for supporting said windmill in a laterally-offset position with respect to said tower, whereby pressure exerted on said air-screw will cause automatic orientation of said air-screw in the wind direction by rotation of said resilient support about its vertical axis.

4. IN a windmill as claimed in claim 2 or 3, wherein said electric generator is suspended from said shaft for guided vertical movement, whereby the belt of said drive is kept taut under the weight of said electric generator.

5. A windmill as in claim 1, wherein said collars are disc-shaped, with flat, opposite, interior faces; said strips being rigidly connected to the interior faces of their respective collars.

* * * * *